United States Patent [19] [11] 4,298,170
Snavely [45] Nov. 3, 1981

[54] SHEAR BAR FOR FORAGE HARVESTERS OR THE LIKE
[75] Inventor: Benjamin H. Snavely, New Holland, Pa.
[73] Assignee: Sperry Corporation, New Holland, Pa.
[21] Appl. No.: 853,379
[22] Filed: Nov. 21, 1977
[51] Int. Cl.³ .............................................. B02C 18/16
[52] U.S. Cl. .................................. 241/222; 83/356.3; 83/448; 241/242
[58] Field of Search ............... 241/167, 221, 222, 242; 83/355, 356.3, 438, 441, 448

[56] References Cited
U.S. PATENT DOCUMENTS

| | | | |
|---|---|---|---|
| 524,274 | 8/1894 | Edwards | 241/242 |
| 1,209,319 | 12/1916 | Mitts | 241/242 X |
| 3,245,301 | 4/1966 | Ward | 83/355 |
| 3,357,467 | 12/1967 | Morkoski | 241/222 X |
| 3,552,463 | 1/1971 | Witt | 241/222 |
| 3,805,660 | 4/1974 | Burrough | 83/356.3 X |

Primary Examiner—Howard N. Goldberg
Attorney, Agent, or Firm—James R. Bell; Frank A. Seemar

[57] ABSTRACT

An improved shear bar for cooperative interaction with the cutterhead of a forage harvester is disclosed. The shear bar structure includes a multiplicity of elongate rib-like projections on the top surface thereof extending lengthwise away from the cutterhead. A scraper for the lower infeed roll is also disclosed to have similar projections on the top surface thereof.

5 Claims, 3 Drawing Figures

U.S. Patent  Nov. 3, 1981  4,298,170
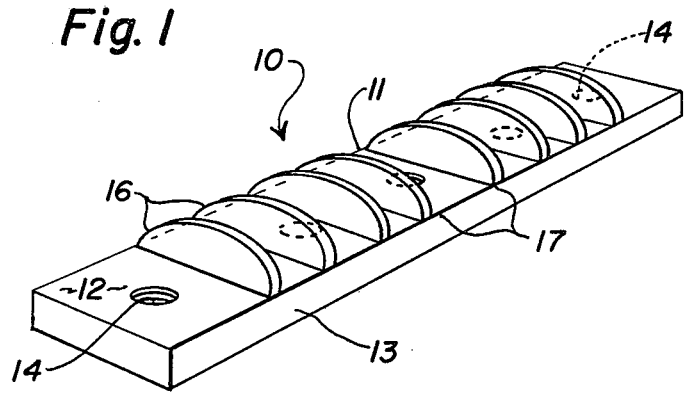
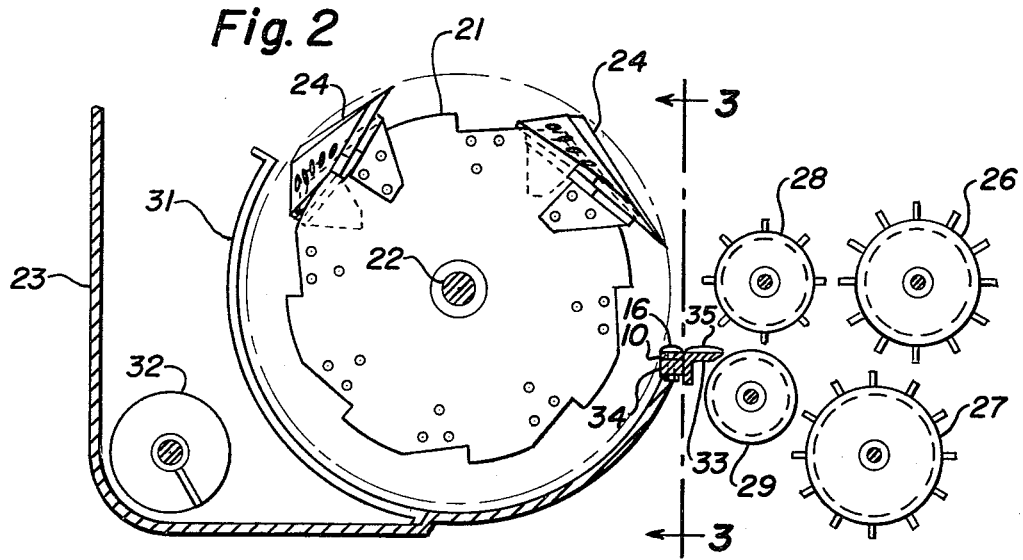
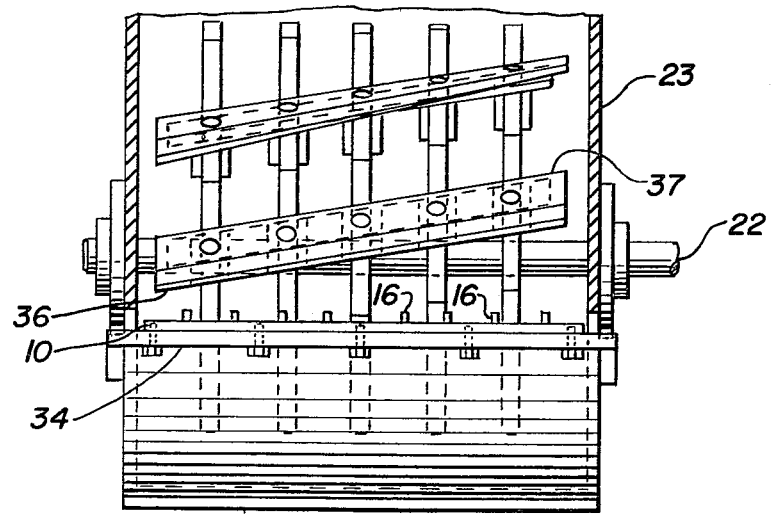

SHEAR BAR FOR FORAGE HARVESTERS OR THE LIKE

BACKGROUND OF THE INVENTION

This invention relates generally to forage harvesters, and specifically to an improved shear bar which reduces crop material movement therealong during the shearing operation and, therefore, promotes more uniform wear characteristics.

Generally speaking, a forage harvester includes at least a pair of opposing infeed rolls which transfer crop material in a ribbon-like mat across a shear bar into engagement with a rotating cutterhead having a multiplicity of knives thereon. The more sophisticated forage harvesters in commercial use today employ a cutterhead with spiral-like knives thereon which move across the stationary shear bar at an angle, thus shearing the crop material as opposed to chopping it. It has been found that the shearing action causes the knives to engage the mat of material and move it slightly toward the trailing edge of the knife. This movement of material results in a build-up along the edge of the shear bar which cooperates with the trailing edge of the knife. Since the crop materials being acted upon are quite abrasive, the prior art shear bars wear unevenly, i.e., the end of the shear bar nearest the trailing edge of the knife wears much more quickly than the remainder. Since uneven wear of the shear bar results in a reduction in overall machine efficiency which cannot be "adjusted out" the shear bar must be periodically reversed or replaced more often than an even wear situation would require.

The invention to be described below reduces the ability of the crop material to move along the shear bar, and thus greatly reduces the uneven wear characteristics heretofore known.

SUMMARY OF THE INVENTION

It is an object of the instant invention to provide a shear bar with improved wear characteristics.

It is another object of the instant invention to provide a shear bar which improves the efficiency and cost effectiveness of a forage harvester by maintaining a uniform mat of material being transported between the infeed rolls and the cutterhead.

It is another object of the instant invention to provide a shear bar and lower infeed roll scraper of improved design with greatly enhanced wear characteristics.

It is a further object of the instant invention to provide an improved shear bar which prevents the build-up of crop material therealong, and thus allows for better control of the cut length of the crop material.

It is an even still further object of the instant invention to provide an improved shear bar which prevents the build-up of crop materials along the length thereof, and thereby reduces wear on the side of the cutterhead chamber.

These and other objects are obtained according to the instant invention by providing an improved shear bar for cooperative interaction with the cutterhead of a forage harvester. The shear bar structure includes a multiplicity of elongate rib-like projections on the top surface thereof extending lengthwise away from the cutterhead. An improved scraper bar is also provided for the lower infeed roll. The scraper also includes similar projections on the top surface thereof.

BRIEF DESCRIPTION OF THE DRAWINGS

The advantages of this invention will become apparent upon consideration of the following detailed disclosure of the invention, especially when it is taken in conjunction with the accompanying drawings wherein:

FIG. 1 is a perspective view of a shear bar constructed according to the principles of the instant invention;

FIG. 2 is a partially schematic side elevational view of a forage harvester employing the teachings of the instant invention; and FIG. 3 is a front plan view taken along lines 3—3 of FIG. 2, showing the cutterbar of the instant invention and its interaction with the cutterhead.

DESCRIPTION OF THE PREFERRED EMBODIMENT

Before describing the environment of intended use and the principles of function, attention will be directed to FIG. 1 which is a perspective view of the novel shear bar of the instant invention. In this preferred embodiment, it can be seen that shear bar 10 comprises an elongated plate-like base member 11 of general rectangular configuration. The base member has a flat top surface 12, an opposing bottom surface (not shown), a shear surface 13, and another shear surface opposite 13 (also not shown). Base member 11 obviously also has two opposing end surfaces which are not numbered in this figure. A plurality of threaded bores 14 extend through the base member and are used to rigidly fix the shear bar to a support in a manner to be further described below. A plurality of spaced apart guide ribs 16 are rigidly affixed to the top surface 12 of the base member 11 and extend away therefrom. The spacing between ribs 16 is not extremely critical; however, certain important considerations in this regard will be discussed below.

Referring now to FIG. 2, the general operational environment of the inventive shear bar can be seen. This schematic side elevational representation of a forage harvester shows a cutterhead 21 mounted on shaft 22 for rotation within a housing 23. A multiplicity of knives 24 (only two being shown) are attached to the periphery of cutterhead 21 and rotate therewith to coact with shear bar 10 in the cutting operation. Infeed rollers 26–29 accept crop material from a pickup (not shown) and feed it therethrough in a ribbon-like mat across the shear bar for engagement with blades 24 of cutterhead 21. The material is then forced through a screen 31, which aids in particle sizing, to an auger 32 which feeds the material transversely of the harvester to a blower (also not shown). It should be realized that the instant invention, while shown and described in reference to a "cut and blow" system, is equally applicable to the "cut and throw" type of forage harvester. Because of varying operational characteristics, some forage harvesters employ a lower infeed roller 29 which has a substantially smooth peripheral surface. When such a roll is used, it is common to further employ a scraper such as the one shown generally at 33. It has been found quite advantageous under certain circumstances to add ribs 35, like those shown on the shear bar of FIG. 1, to the top surface of the scraper 33; however, a scraper of such design has been determined to add very little to the increased performance attributable to the novel shear bar 10.

FIG. 3 is a sectional view of FIG. 2, and shows the relationship of the cutterbar 10 with the knife 24 as the two are coacting to shear the crop material. The crop material is fed over the shear bar 10 in a ribbon-like mat which, ideally, is substantially the same width as the shear bar itself. As the material mat crosses the shear bar and blade 24 continues its circular path of travel, the leading edge 36 of the blade crosses the shear bar before the trailing edge 37 thereof. This angular engagement of the material mat causes the material, especially that on the right hand side of the shear bar to move slightly to the right and build-up in the corner adjacent the shear bar and the housing 23. As stated, the nature of the materials being operated upon is such that an abrasive wear situation arises which causes the shear bar to wear more quickly in the corner area than elsewhere. Eventually, the wear becomes so great that the shear bar must be prematurely reversed. The ribs 16 on shear bar 10 substantially prevent the crop material from moving relative to the shear bar, and thus greatly reduce, or eliminate, the build-up problem.

Since the build-up of crop material occurs primarily on the trailing end of the knives (as viewed in FIG. 3), it is most important that the ribs 16 be located on that side; however, since it is common practice for a shear bar to be reversible to extend its useful life, the construction shown in the figures includes ribs substantially across the top surface of the shear bar. An economical modification of the system is to leave a gap 17, see FIGS. 1 and 3, at the center of the shear bar where very little damaging crop movement occurs. Also, because the shear bar must be slidingly inserted in the housing, it is contemplated that many of the shear bars made according to the instant invention will have unobstructed end portions.

The ribs 16 may be constructed to have any suitable size and profile, so long as the function of a guide is maintained. The semi-circular configuration shown has proven quite satisfactory; however, other regular or irregular shapes such as rectangular, triangular, etc. would perform the necessary function. The ribs may be unitary with the base 11, or may be affixed thereto in any suitable manner, such as, for example, by welding. In regard to size and spacing, a very satisfactory result has been obtained by using semicircular ribs projecting approximately ⅜ inch above the top of the base member and spaced approximately 1⅜ inches apart.

For example, the shear bar 10 shown in the attached drawings must be mounted to a support as shown at 34 in FIG. 2. This two-piece arrangement is not necessary if the base member 11 is made more physically substantial in the first place. The choice of one- or two-piece construction is irrelevant to the invention, such being a design parameter unrelated to the operational characteristics of the shear bar.

Also, for example, it should be realized that the instant invention is equally applicable to forage harvesters which employ either V-shaped or inverted V-shaped cutters. Both arrangements result in trailing knife edges, and, thus, uneven wear on the blades and/or shear bar.

It will be understood that various changes in the details, materials, and arrangement of parts which have herein been described and illustrated in order to explain the nature of the invention will occur to and may be made by those skilled in the art upon a reading of the disclosure. All such obvious changes are intended to fall within the scope of the following claims.

Having thus described the invention, what is claimed is:

1. In a forage harvester having a rotatable cutterhead, a shear bar arranged to cooperate with the cutterhead to reduce crop materials to substantially uniform lengths, an infeed mechanism to direct a mat of crop material across the shear bar into engagement with the cutterhead, an improved shear bar comprising:
    a substantially rectangular plate like base having a top surface with length and width dimension, an opposing bottom surface, and first and second opposing shear surfaces extending the full length dimension perpendicular to said top and bottom surfaces; and
    a plurality of fixed substantially identical projections extending from said top surface of said base in a direction opposite said bottom surface, said projections spaced apart along the length of said base and each having a primary dimension substantially parallel and equal to the width of said base, whereby each projection extends across said top surface between said first and second shear surfaces.

2. The forage harvester of claim 1 wherein the spacing between said plurality of projections is substantially regular.

3. The forage harvester of claim 1 wherein said primary dimensions of said projections is their length, and each projection has a width which is smaller than the length thereof.

4. The forage harvester of claim 3 wherein each said projection has a curvilinear lengthwise cross section configuration, the ends thereof converging towards said top surface of said base.

5. The forage harvester of claim 4 wherein the spacing between said plurality of projections is substantially regular.

* * * * *